(12) United States Patent
Liang et al.

(10) Patent No.: US 10,574,341 B1
(45) Date of Patent: Feb. 25, 2020

(54) CHANNEL RECONFIGURABLE MILLIMETER-WAVE RF SYSTEM

(71) Applicant: LOON LLC, Mountain View, CA (US)

(72) Inventors: Jing Liang, Santa Clara, CA (US); Dedi David Haziza, Sunnyvale, CA (US)

(73) Assignee: LOON LLC, Mountain View, CA (US)

( * ) Notice: Subject to any disclaimer, the term of this patent is extended or adjusted under 35 U.S.C. 154(b) by 506 days.

(21) Appl. No.: 14/881,206

(22) Filed: Oct. 13, 2015

(51) Int. Cl.
*H04B 7/185* (2006.01)
*H04L 5/14* (2006.01)
*H04W 72/04* (2009.01)

(52) U.S. Cl.
CPC ........... *H04B 7/18513* (2013.01); *H04L 5/14* (2013.01); *H04W 72/0453* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,742,358 A | * | 6/1973 | Cesaro | H04B 7/185 455/9 |
| 5,378,155 A | * | 1/1995 | Eldridge | F41G 3/26 340/988 |
| 5,603,079 A | * | 2/1997 | Olds | H04B 7/18567 455/12.1 |
| 5,691,974 A | * | 11/1997 | Zehavi | H04B 1/7085 370/203 |
| 5,722,049 A | * | 2/1998 | Hassan | H04B 7/18534 455/10 |
| 5,971,324 A | * | 10/1999 | Williams | B64G 1/1007 244/158.4 |
| 6,061,562 A | * | 5/2000 | Martin | H01Q 3/242 455/431 |
| 6,151,308 A | * | 11/2000 | Ibanez-Meier | H04B 7/18508 370/316 |
| 6,282,417 B1 | * | 8/2001 | Ward | G08G 5/0013 455/431 |
| 6,285,878 B1 | * | 9/2001 | Lai | H04B 7/18506 455/431 |
| 6,781,968 B1 | * | 8/2004 | Colella | H04B 7/18504 342/354 |
| 7,072,977 B1 | * | 7/2006 | Bernard | B64D 11/0015 709/238 |
| RE40,479 E | * | 9/2008 | Wright | G08G 5/0013 340/539.22 |
| 7,438,261 B2 | * | 10/2008 | Porter | B64B 1/06 244/123.11 |

(Continued)

*Primary Examiner* — Zhiyu Lu
(74) *Attorney, Agent, or Firm* — Botos Churchill IP Law LLP

(57) ABSTRACT

A channel reconfigurable millimeter-wave RF system is disclosed including, a high altitude platform, a first and second radio frequency module connected to the high altitude platform. The first radio frequency module includes a first transceiver configured to operate the first antenna at a frequency of greater than approximately 30 GHz and includes a first controller connected to the first transceiver and configured to transmit and received data through a first antenna. The first controller is configured to disable the second radio frequency module based on data received through the first antenna.

20 Claims, 14 Drawing Sheets

(56) References Cited

U.S. PATENT DOCUMENTS

| | | | | |
|---|---|---|---|---|
| 8,111,622 B2* | 2/2012 | Cohen | ................. | H04W 40/18 370/236 |
| 8,463,459 B2* | 6/2013 | Breshears | ............ | G01S 5/0081 342/353 |
| 2002/0072361 A1* | 6/2002 | Knoblach | .......... | H04B 7/18504 455/431 |
| 2003/0040273 A1* | 2/2003 | Seligsohn | ................. | B64B 1/44 455/12.1 |
| 2003/0045322 A1* | 3/2003 | Baer | ................. | H04B 7/18506 455/527 |
| 2004/0072561 A1* | 4/2004 | LaPrade | ............. | H04B 7/18582 455/427 |
| 2004/0102191 A1* | 5/2004 | Pewitt | ................. | H04B 7/18504 455/431 |
| 2005/0014499 A1* | 1/2005 | Knoblach | .......... | H04B 7/18576 455/431 |
| 2005/0090201 A1* | 4/2005 | Lengies | ............. | H04B 7/18506 455/41.2 |
| 2006/0009262 A1* | 1/2006 | Hamm | ............... | H04B 7/18506 455/561 |
| 2006/0030311 A1* | 2/2006 | Cruz | ...................... | H01Q 1/246 455/431 |
| 2006/0250965 A1* | 11/2006 | Irwin | ................... | H04L 45/121 370/238 |
| 2007/0274226 A1* | 11/2007 | Tillotson | ................. | H02J 17/00 370/252 |
| 2008/0102814 A1* | 5/2008 | Chari | ..................... | H01Q 1/283 455/424 |
| 2009/0028225 A1* | 1/2009 | Runyon | .................. | H01Q 1/42 375/219 |
| 2012/0039329 A1* | 2/2012 | Sun | ...................... | H04B 1/1027 370/345 |
| 2014/0128098 A1* | 5/2014 | Behrens | ............ | H04B 7/18513 455/456.1 |
| 2015/0131513 A1* | 5/2015 | Lauer | ..................... | H04W 4/06 370/312 |
| 2015/0358070 A1* | 12/2015 | Ohm | ................... | H04B 7/0608 370/329 |
| 2016/0142095 A1* | 5/2016 | Pos | ........................ | H01Q 21/30 455/78 |
| 2016/0323031 A1* | 11/2016 | Cain | .................... | H04B 1/1009 |

* cited by examiner

```
                                                      ┌─ 700
                                                      ↙
┌─────────────────────────────────────────────────┐
│  Transmitting Data From A First High Altitude Platform To A  │
│  Second High Altitude Platform Using A First Radio           │
│  Frequency Module Connected To The First High Altitude       │
│                    Platform                                  │
│                                                   702        │
└─────────────────────────────────────────────────┘
                         │
                         ▼
┌─────────────────────────────────────────────────┐
│                                                              │
│     Receiving Data At The First High Altitude Platform       │
│     Transmitted From The Second High Altitude Platform       │
│     Using A Second Radio Frequency Module Connected To       │
│            The First High Altitude Platform,                 │
│     Wherein The First Radio Frequency Module Comprises:      │
│        A First Antenna; A First Channel Duplexing Device     │
│     Connected To The First Antenna; A First Plurality Of     │
│     Channel Reconfiguration Devices Connected To The First   │
│        Antenna; A First Transceiver Connected To The First   │
│     Antenna, The First Transceiver Configured To Operate The │
│           First Antenna At A Frequency Of Greater Than       │
│     Approximately 30 GHz; And A First Controller Connected   │
│     To The First Transceiver And Configured To Transmit And  │
│        Receive Data Through The First Antenna, And Wherein   │
│           The Second Radio Frequency Module Comprises:       │
│                       A Second Antenna;                      │
│     A Second Channel Duplexing Device Connected To The       │
│           Second Antenna; A Second Plurality Of Channel      │
│        Reconfiguration Devices Connected To The Second       │
│           Antenna; A Second Transceiver Connected To The     │
│     Second Antenna, The Second Transceiver Configured To     │
│     Operate The Second Antenna At A Frequency Of Greater     │
│        Than Approximately 30 GHz; And A Second Controller    │
│     Connected To The Second Transceiver And Configured To    │
│     Transmit And Receive Data Through The Second Antenna.    │
│                                                   704        │
└─────────────────────────────────────────────────┘        FIG. 7
```

CHANNEL RECONFIGURABLE MILLIMETER-WAVE RF SYSTEM

TECHNICAL FIELD

This disclosure relates to Channel Reconfigurable Millimeter-Wave radio frequency (RF) System.

BACKGROUND

A communication network is a large distributed system for receiving information (signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. In addition, some areas of the world are not connected to a communication network and therefore cannot be part of the global community where everything is connected to the internet.

Satellites are used to provide communication services to areas where wired cables cannot reach. Satellites may be geostationary or non-geostationary. Geostationary satellites remain permanently in the same area of the sky as viewed from a specific location on earth, because the satellite is orbiting the equator with an orbital period of exactly one day. Non-geostationary satellites typically operate in low- or mid-earth orbit, and do not remain stationary relative to a fixed point on earth; the orbital path of a satellite can be described in part by the plane intersecting the center of the earth and containing the orbit. Each satellite may be equipped with communication devices called inter-satellite links (or, more generally, inter-device links) to communicate with other satellites in the same plane or in other planes. The communication devices allow the satellites to communicate with other satellites. These communication devices are expensive and heavy. In addition, the communication devices significantly increase the cost of building, launching and operating each satellite; they also greatly complicate the design and development of the satellite communication system and associated antennas and mechanisms to allow each satellite to acquire and track other satellites whose relative position is changing. Each antenna has a mechanical or electronic steering mechanism, which adds weight, cost, vibration, and complexity to the satellite, and increases risk of failure. Requirements for such tracking mechanisms are much more challenging for inter-satellite links designed to communicate with satellites in different planes than for links, which only communicate with nearby satellites in the same plane, since there is much less variation in relative position. Similar considerations and added cost apply to high-altitude communication balloon systems with inter-balloon links.

SUMMARY

This disclosure provides a reconfigurable radio system, which may be implemented with a multi-channel multiplexer in conjunction with a millimeter wave Tx/Rx switch module or a circulator that redirects transmit and receive channels on demand. The reconfigurable radio system allows for multiple point-to-point radio links for the redirection of a signal in space and accommodates transmit and receive reconfiguration on both ends of the link for multiple frequency sub-channels.

One aspect of the disclosure provides a system for operating a channel reconfigurable millimeter-wave RF system. The system includes a high altitude platform (or mobile platform) and first and second radio frequency modules connected to the high altitude platform. The first radio frequency module includes a first antenna, a first channel duplexing device connected to the first antenna, a first plurality of channel reconfiguration devices connected to the first antenna, and a first transceiver connected to the first antenna. The first transceiver is configured to operate the first antenna at a frequency of greater than approximately 30 GHz. The first radio frequency module further includes a first controller connected to the first transceiver and configured to transmit and received data through the first antenna. The second radio frequency module includes a second antenna, a second channel duplexing device connected to the second antenna, a second plurality of channel reconfiguration devices connected to the second antenna and a second transceiver connected to the second antenna. The second transceiver is configured to operate the second antenna at a frequency of greater than approximately 30 GHz. The second radio frequency module further includes a second controller connected to the second transceiver and configured to transmit and receive data through the second antenna or a control and non-payload communication link. The first controller is configured to disable the second radio frequency module based on data received through the first antenna.

Implementations of the disclosure may include one or more of the following optional features. In some implementations, the first radio frequency module further includes one or more sensors connected to the controller and configured to sense position, attitude, and/or heading (e.g., pitch, yaw, and roll) information regarding the high altitude platform. The controller may be configured to transmit the position information, attitude, and/or heading from the sensor through an auxiliary radio link (or a control and non-payload communication link). The antenna may be steerable and steered based on the position, attitude, and/or heading information.

In some examples, the first controller is configured to change the first transceiver from a receive configuration to a transmit configuration based on network traffic requirements and a geometrical status of the high-altitude platform received through the auxiliary radio link (or a control and non-payload communication link). The first radio frequency module may be configured to change the second radio frequency module from a receive configuration to a transmit configuration based on data received through the auxiliary radio link. The first antenna may be a phased array antenna, and the second antenna may be a mechanically steered antenna. The first transceiver may transmit using a burst mode transmission.

Another aspect of the disclosure provides a method for operating a channel reconfigurable millimeter-wave RF system. The method includes transmitting data from a first high altitude platform to a second high altitude platform using a first radio frequency module connected to the first high altitude platform. The method also includes receiving data at the first high altitude platform transmitted from the second high altitude platform using a second radio frequency module connected to the first high altitude platform. The first radio frequency module includes a first antenna, a first channel duplexing device connected to the first antenna, a first plurality of channel reconfiguration devices connected to the first antenna, and a first transceiver connected to the first antenna. The first transceiver is configured to operate the first antenna at a frequency of greater than approximately 30 GHz. The first transceiver further includes a first controller connected to the first transceiver and configured to transmit and receive data through the first antenna. The second radio frequency includes a second antenna, a second channel duplexing device connected to the second antenna, a second plurality of channel reconfiguration devices connected to the second antenna, and a second transceiver connected to the second antenna. The second transceiver is configured to operate the second antenna at a frequency of greater than approximately 30 GHz. The second controller is connected to the second transceiver and configured to transmit and receive data through the second antenna.

This aspect may include one or more of the following optional features. The first controller may be configured to disable transmitting electronics of the second radio frequency module and enable receiving electronics of the second radio frequency module based on data received through from a command link. In some examples, the first controller may be configured to disable the second radio frequency module based on data received through the first antenna. The first radio frequency module may include one or more sensors connected to the first controller and configured to sense position, attitude, and/or heading (e.g., pitch, yaw, and roll) information regarding the first high altitude platform. The method may further include transmitting position, attitude, and/or heading (pitch, yaw, roll) information through an auxiliary radio link. The method may include steering the first antenna based on the position, attitude, and/or heading (e.g., pitch, yaw, and roll) information (of either of the first high altitude platform or the second high altitude platform).

In some examples, the method includes adjusting the first transceiver from a receive configuration to a transmit configuration based on network traffic requirements and a geometrical status of the high-altitude platform received through the auxiliary radio link (or a control and non-payload communication link). The method may further include adjusting the second radio frequency module from a receive configuration to a transmit configuration based on data received through the auxiliary radio link or a control and non-payload communication link. The method may also include adjusting the first and second radio frequency module from a receive configuration to a transmit configuration based on the amount of data received through the first radio frequency module and second radio frequency module.

In some implementations, the first antenna is a phased array antenna and the second antenna is a mechanically steered antenna. The method may include transmitting/receiving data to/from a ground station. The first transceiver may operate a full duplex bi-directional communication link.

In some examples, the method includes transmitting or receiving data to/from a ground station using a third radio frequency module while simultaneously transmitting data to the second high altitude platform using the first radio frequency module and receiving data from the second high altitude platform using the second radio frequency module. The method may also include transmitting data to a satellite using a third radio frequency module while simultaneously transmitting or receiving data to/from the second high altitude platform using the first radio frequency module and receiving data from the second high altitude platform using the second radio frequency module. The method may further include transmitting or receiving data to/from a ground station using a fourth radio frequency module while simultaneously transmitting data to the second high altitude platform using the first radio frequency module, transmitting data to satellite using the third radio frequency module, and receiving data from the second high altitude platform using the second radio frequency module.

Another aspect of the disclosure provides a system for operating a channel reconfigurable millimeter-wave RF system. The system includes a high altitude platform, an antenna connected to the high altitude platform, and a first and second radio frequency module connected to the high altitude platform. The first radio frequency module includes, a first channel duplexing device connected to the antenna, a first plurality of channel reconfiguration devices connected to the first channel duplexing device; and a first transceiver connected to first plurality of channel reconfiguration devices, the first transceiver configured to operate at a frequency of greater than approximately 30 GHz. The second radio frequency module connected to the high altitude platform, the second radio frequency module includes, a second channel duplexing device connected to the antenna, a second plurality of channel reconfiguration devices connected to the second channel duplexing device; and a second transceiver connected to the second plurality of channel reconfiguration devices, the second transceiver configured to operate at a frequency of greater than approximately 30 GHz. The system includes a controller connected to the first radio frequency module and second radio frequency module and configured to transmit and receive data through the antenna. In some examples, the system further includes a polarizer (Vertical, Horizontal, Left-Hand Circular and/or Right-Hand Circular) connected between the antenna and the first and second channel duplexing device. The first channel duplexing device or the second channel duplexing device (diplexer, triplexer, and/or n-port multiplexer) may be a multiplexer.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7 is a schematic view of a method for operating a RF module attached to a high altitude platform.

DETAILED DESCRIPTION

Figure 1A:
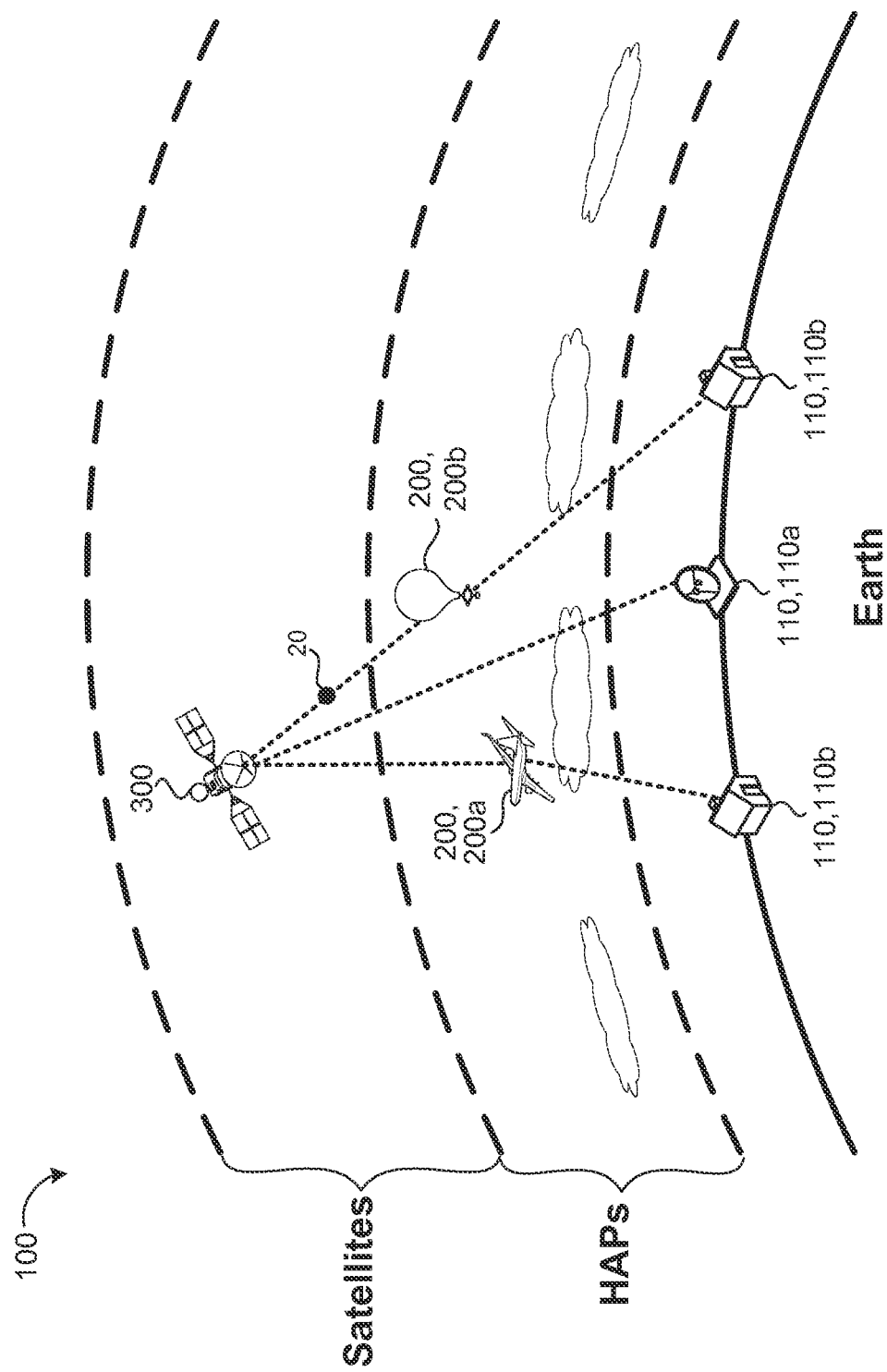
FIG. 1A is a schematic view of an exemplary communication system.
Figure 1B:
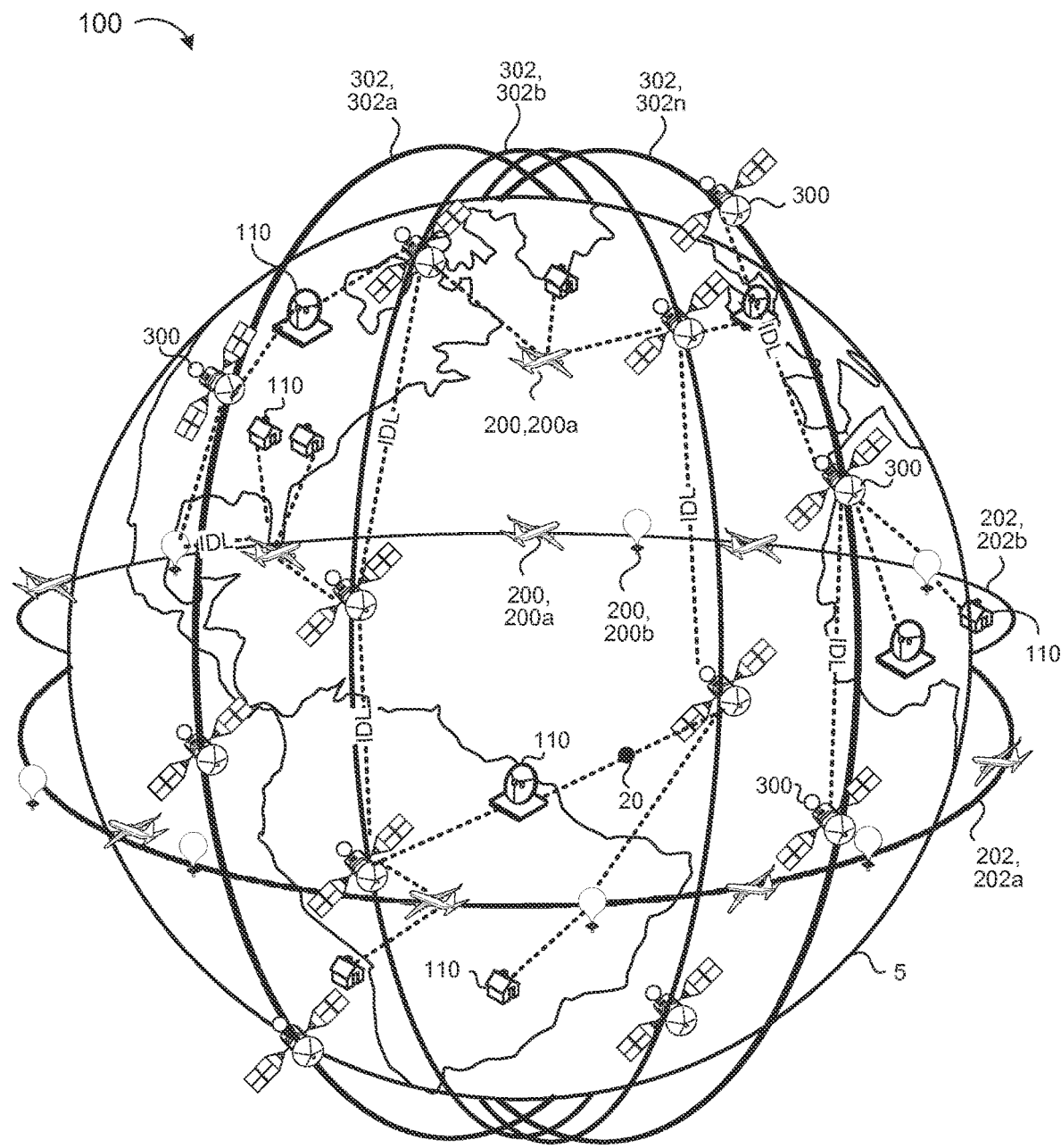
FIG. 1B is a schematic view of an exemplary global-scale communication system with satellites and communication balloons, where the satellites form a polar constellation.
Figure 1C:
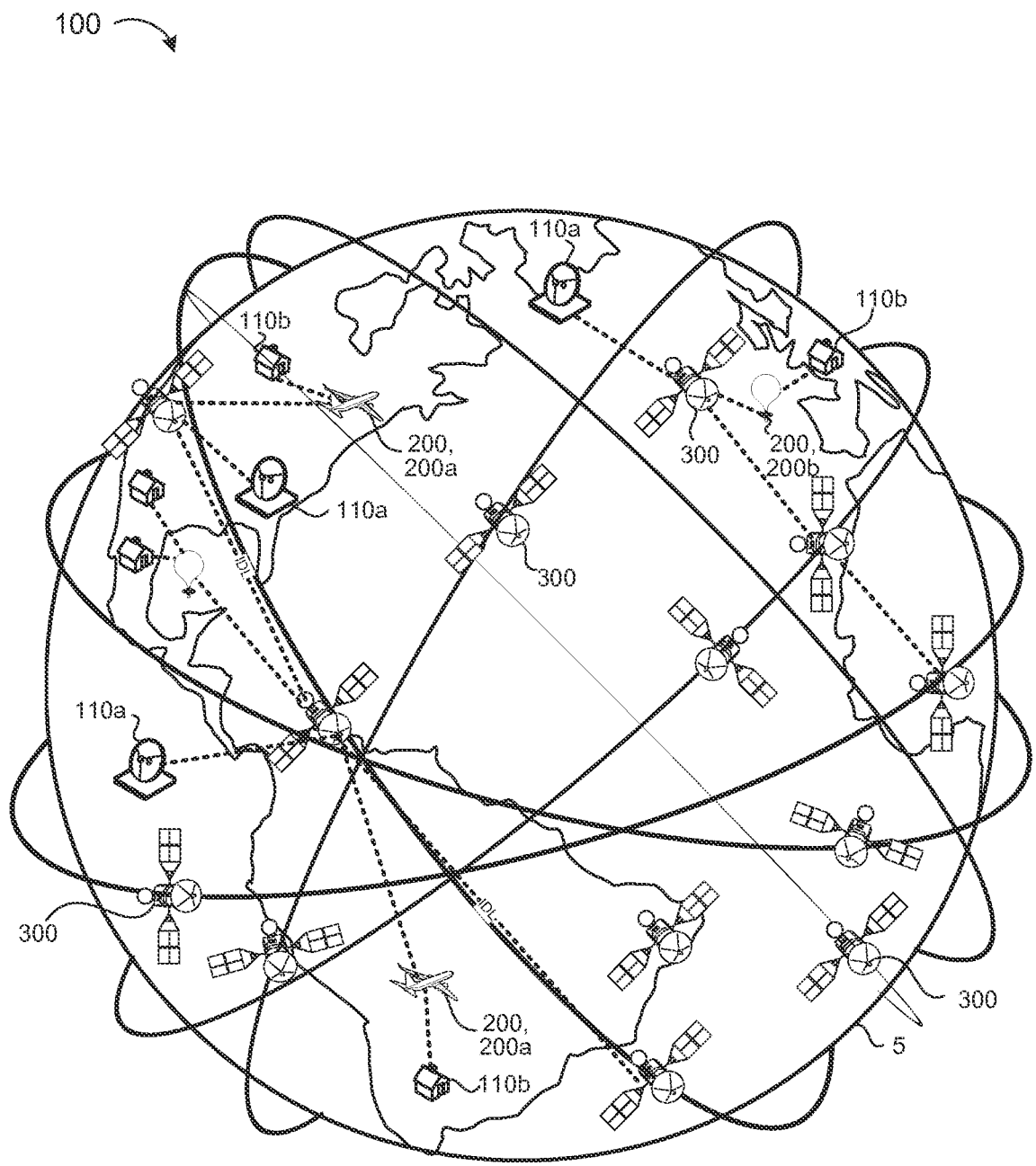
FIG. 1C is a schematic view of an exemplary group of satellites of FIG. 1A forming a Walker constellation.

Referring to FIGS. 1A-1C, in some implementations, a global-scale communication system 100 includes gateways 110 (e.g., source ground stations 110a and destination ground stations 110b), high altitude platforms (HAPs) 200, and satellites 300. The source ground stations 110a may communicate with the satellites 300, the satellites 300 may communicate with the HAPs 200, and the HAPs 200 may communicate with the destination ground stations 110b. In some examples, the source ground stations 110a also operate as linking-gateways between satellites 300. The source ground stations 110a may be connected to one or more service providers and the destination ground stations 110b may be user terminals (e.g., mobile devices, residential WiFi devices, home networks, etc.). In some implementations, a HAP 200 is an aerial communication device that operates at high altitudes (e.g., 17-22 km). The HAP may be released into the earth's atmosphere, e.g., by an air craft, or flown to the desired height. Moreover, the HAP 200 may operate as a quasi-stationary aircraft. In some examples, the HAP 200 is an aircraft 200a, such as an unmanned aerial vehicle (UAV); while in other examples, the HAP 200 is a communication balloon 200b. The satellite 300 may be in Low Earth Orbit (LEO), Medium Earth Orbit (MEO), or High Earth Orbit (HEO), including Geosynchronous Earth Orbit (GEO).

The HAPs 200 may move about the earth 5 along a path, trajectory, or orbit 202 (also referred to as a plane, since their orbit or trajectory may approximately form a geometric plane). Moreover, several HAPs 200 may operate in the same or different orbits 202. For example, some HAPs 200 may move approximately along a latitude of the earth 5 (or in a trajectory determined in part by prevailing winds) in a first orbit 202a, while other HAPs 200 may move along a different latitude or trajectory in a second orbit 202b. The HAPs 200 may be grouped amongst several different orbits 202 about the earth 5 and/or they may move along other paths 202 (e.g., individual paths). Similarly, the satellites 300 may move along different orbits 302, 302a-n. Multiple satellites 300 working in concert form a satellite constellation. The satellites 300 within the satellite constellation may operate in a coordinated fashion to overlap in ground coverage. In the example shown in FIG. 1B, the satellites 300 operate in a polar constellation by having the satellites 300 orbit the poles of the earth 5; whereas, in the example shown in FIG. 1C, the satellites 300 operate in a Walker constellation, which covers areas below certain latitudes and provides a larger number of satellites 300 simultaneously in view of a gateway 110 on the ground (leading to higher availability, fewer dropped connections).

Figure 2B:
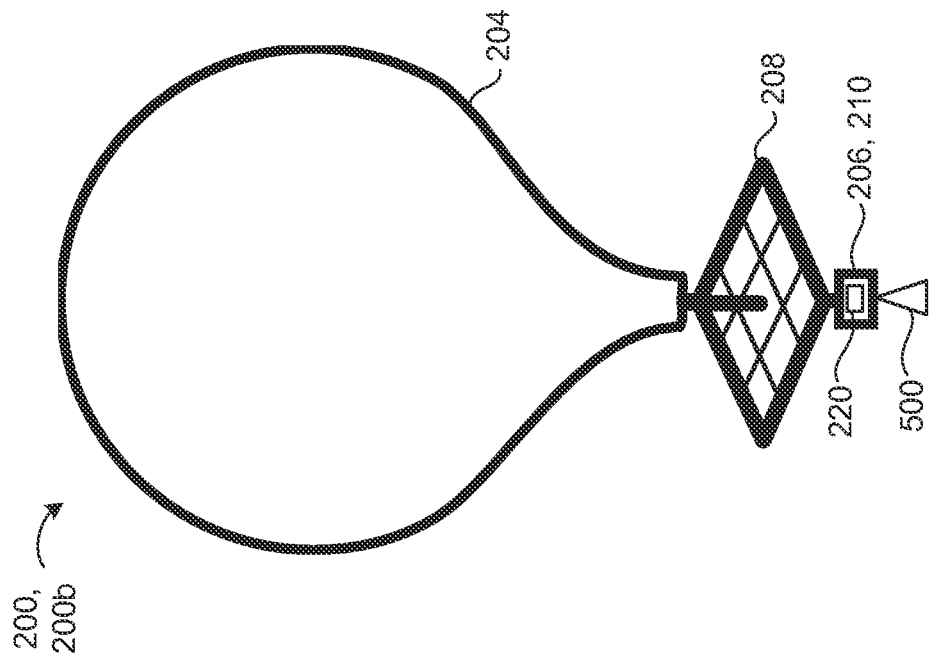
FIGS. 2A and 2B are perspective views of example high-altitude platforms.
Figure 2A:
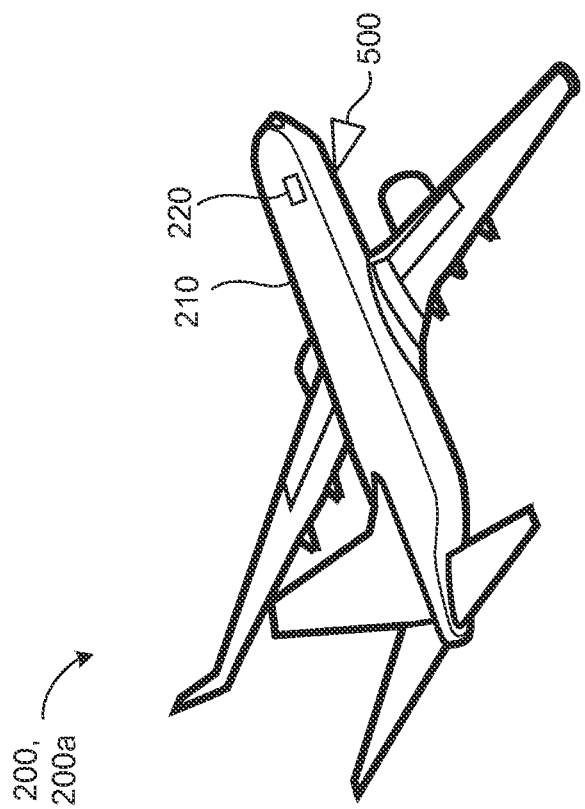

Referring to FIGS. 2A and 2B, in some implementations, the HAP 200 includes a HAP body 210 and an antenna 512 disposed on the HAP body 210 that receives a communication 20 from a satellite 300 and reroutes the communication 20 to a destination ground station 110b and vice versa. The HAP 200 may include a data processing device 220 that processes the received communication 20 and determines a path of the communication 20 to arrive at the destination ground station 110b (e.g., user terminal). In some implementations, user terminals 110b on the ground have specialized antennas that send communication signals to the HAPs 200. The HAP 200 receiving the communication 20 sends the communication 20 to another HAP 200, to a satellite 300, or to a gateway 110 (e.g., a user terminal 110b).

FIG. 2B illustrates an example communication balloon 200b that includes a balloon 204 (e.g., sized about 49 feet in width and 39 feet in height and filled with helium or hydrogen), an equipment box 206 as a HAP body 210, and solar panels 208. The equipment box 206 includes a data processing device 310 that executes algorithms to determine where the high-altitude balloon 200a needs to go, then each high-altitude balloon 200b moves into a layer of wind blowing in a direction that may take it where it should be going. The equipment box 206 also includes batteries to store power and a transceiver (e.g., antennas 512) to communicate with other devices (e.g., other HAPs 200, satellites 300, gateways 110, such as user terminals 110b, internet antennas on the ground, etc.). The solar panels 208 may power the equipment box 206.

Communication balloons 200a are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 200a float in the stratosphere at an altitude twice as high as airplanes and the weather (e.g., 20 km above the earth's surface). The high-altitude balloons 200a are carried around the earth 5 by winds and can be steered by rising or descending to an altitude with winds moving in the desired direction. Winds in the stratosphere are usually steady and move slowly at about five and 20 mph, and each layer of wind varies in direction and magnitude.

Figure 3:
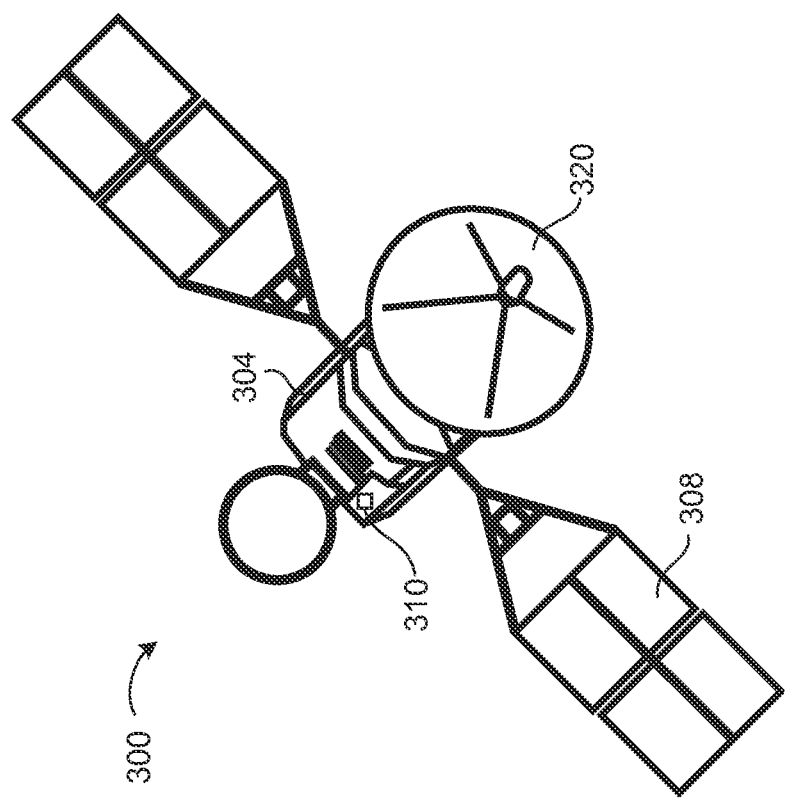
FIG. 3 is a perspective view of an example satellite.

Referring to FIG. 3, a satellite 300 is an object placed into orbit 302 around the earth 5 and may serve different purposes, such as military or civilian observation satellites, communication satellites, navigations satellites, weather satellites, and research satellites. The orbit 302 of the satellite 300 varies depending in part on the purpose of the satellite 200b. Satellite orbits 302 may be classified based on their altitude from the surface of the earth 5 as Low Earth Orbit (LEO), Medium Earth Orbit (MEO), and High Earth Orbit (HEO). LEO is a geocentric orbit (i.e., orbiting around the earth 5) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit.

In some implementations, a satellite 300 includes a satellite body 304 having a data processing device 310, e.g., similar to the data processing device 310 of the HAPs 200. The data processing device 310 executes algorithms to determine where the satellite 300 is heading. The satellite 300 also includes an antenna 320 for receiving and transmitting a communication 20. The satellite 300 includes solar panels 308 mounted on the satellite body 204 for providing power to the satellite 300. In some examples, the satellite 300 includes rechargeable batteries used when sunlight is not reaching and charging the solar panels 308.

When constructing a global-scale communications system 100 using HAPs 200, it is sometimes desirable to route traffic over long distances through the system 100 by linking HAPs 200 to satellites 300 and/or one HAP 200 to another.

For example, two satellites 300 may communicate via inter-device links and two HAPs 200 may communicate via inter-device links. Inter-device link (IDL) eliminates or reduces the number of HAPs 200 or satellites 300 to gateway 110 hops, which decreases the latency and increases the overall network capabilities. Inter-device links allow for communication traffic from one HAP 200 or satellite 300 covering a particular region to be seamlessly handed over to another HAP 200 or satellite 300 covering the same region, where a first HAP 200 or satellite 300 is leaving the first area and a second HAP 200 or satellite 300 is entering the area. Such inter-device linking is useful to provide communication services to areas far from source and destination ground stations 110a, 110b and may also reduce latency and enhance security (fiber optic cables may be intercepted and data going through the cable may be retrieved). This type of inter-device communication is different than the "bent-pipe" model, in which all the signal traffic goes from a source ground station 110a to a satellite 300, and then directly down to a destination ground station 110b (e.g., user terminal) or vice versa. The "bent-pipe" model does not include any inter-device communications. Instead, the satellite 300 acts as a repeater. In some examples of "bent-pipe" models, the signal received by the satellite 300 is amplified before it is re-transmitted; however, no signal processing occurs. In other examples of the "bent-pipe" model, part or all of the signal may be processed and decoded to allow for one or more of routing to different beams, error correction, or quality-of-service control; however no inter-device communication occurs.

In some implementations, large-scale communication constellations are described in terms of a number of orbits 202, 302, and the number of HAPs 200 or satellites 300 per orbit 202, 302. HAPs 200 or satellites 300 within the same orbit 202, 302 maintain the same position relative to their intra-orbit HAP 200 or satellite 300 neighbors. However, the position of a HAP 200 or a satellite 300 relative to neighbors in an adjacent orbit 202, 302 may vary over time. For example, in a large-scale satellite constellation with near-polar orbits, satellites 300 within the same orbit 202 (which corresponds roughly to a specific latitude, at a given point in time) maintain a roughly constant position relative to their intra-orbit neighbors (i.e., a forward and a rearward satellite 300), but their position relative to neighbors in an adjacent orbit 302 varies over time. A similar concept applies to the HAPs 200; however, the HAPs 200 move about the earth 5 along a latitudinal plane and maintain roughly a constant position to a neighboring HAP 200.

A source ground station 110a may be used as a connector between satellites 300 and the internet, or between HAPs 200 and user terminals 110b. In some examples, the system 100 utilizes the source ground station 110a as linking-gateways 110a for relaying a communication 20 from one HAP 200 or satellite 300 to another HAP 200 or satellite 300, where each HAP 200 or satellite 300 is in a different orbit 202, 302. For example, the linking-gateway 110a may receive a communication 20 from an orbiting satellite 300, process the communication 20, and switch the communication 20 to another satellite 300 in a different orbit 302. Therefore, the combination of the satellites 300 and the linking-gateways 110a provide a fully-connected system 100. For the purposes of further examples, the gateways 110 (e.g., source ground stations 110a and destination ground stations 110b), shall be referred to as ground stations 110.

Figure 4:
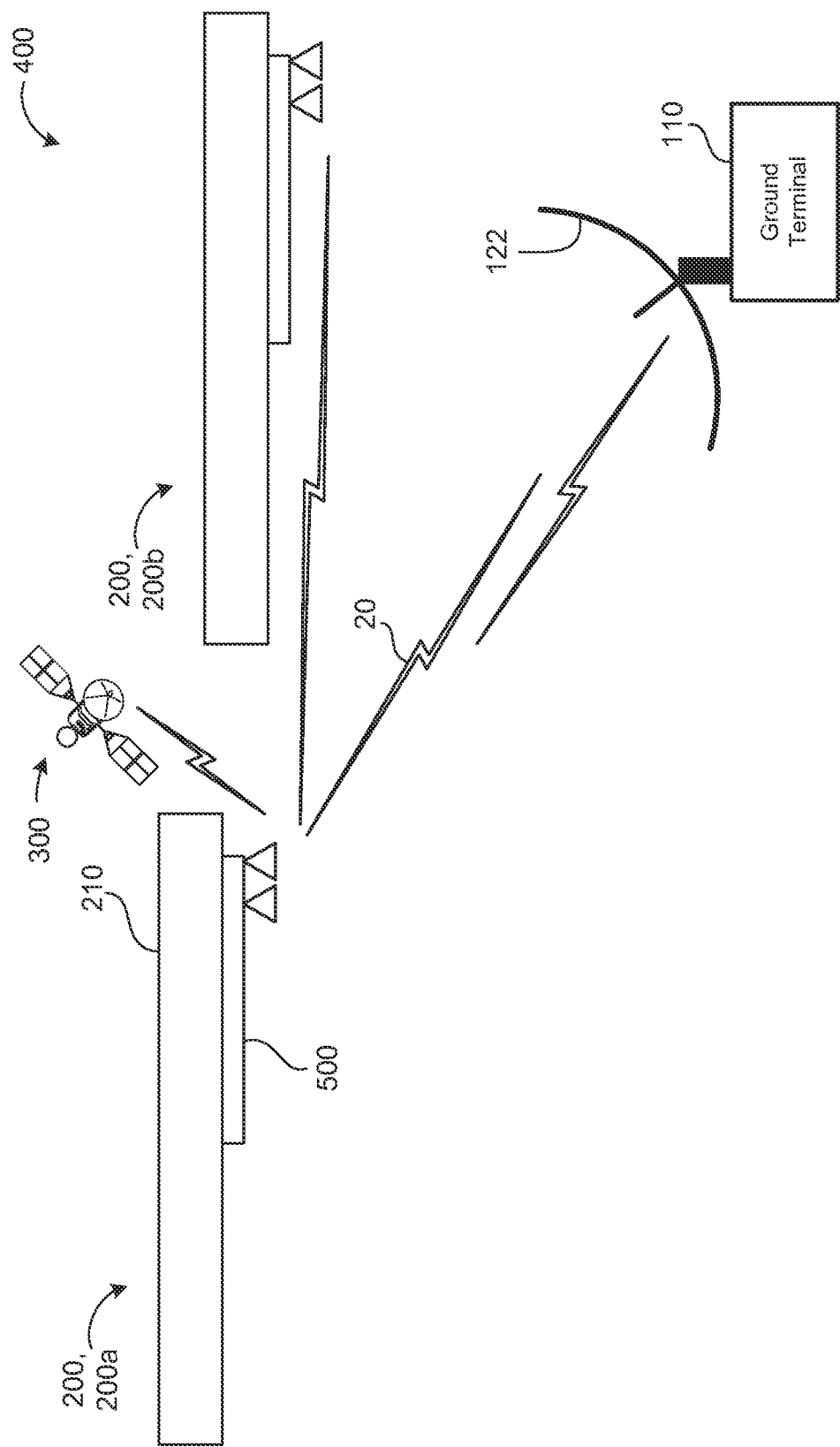
FIG. 4 is a schematic view of an exemplary architecture of a communication system establishing a communications link between a first high altitude platform, a second high altitude platform, a satellite and a ground station.

FIG. 4 provides a schematic view of an exemplary architecture of a communication system 400 establishing a communications link between a first HAP 200a, a second HAP 200b, satellites 300 and a ground station 110 (e.g., a gateway 110). In some examples, the HAP 200 is an unmanned aerial system (UAS). The two terms are used interchangeably throughout this application. In the example shown, the HAP 200 includes a body 210 that supports a radio frequency module 500 (RF module), which can communicate with the ground station 110 through a communication 20 (e.g., radio signals or electromagnetic energy). The examples in this application use a HAP 200 as the carrier for the RF module 500, it is also suitable to use on ground stations 110, satellites 300 or other devices in which radio communication is necessary. In some examples, a first HAP 200a can communicate directly with a second HAP 200b, satellites 300 and the ground station 110. The first HAP 200a may use a single RF module 500 and communicate with each device or the first HAP 200a may use multiple RF modules 500 to communicate with a combination of the second HAP 200b, and the ground station 110 simultaneously. The ground station 110 includes a ground antenna 122 designed to communicate with the HAP 200. The HAP 200 may communicate various data and information to the ground station 110, such as, but not limited to, airspeed, heading, attitude position, temperature, GPS (global positioning system) coordinates, wind conditions, flight plan information, fuel quantity, battery quantity, data received from other sources, data received from other antennas, sensor data, etc. The ground station 110 may communicate to the HAP 200 various data and information, such as, but not limited to, flight directions, flight condition warnings, control inputs, requests for information, requests for sensor data, data to be retransmitted via other antennas or systems, etc. The HAP 200 may be various implementations of flying craft including a combination of the following such as, but not limited to an airplane, airship, helicopter, gyrocopter, blimp, multicopter, glider, balloon, fixed wing, rotary wing, rotor aircraft, lifting body, heavier than air craft, lighter than air craft, etc.

One of the challenges associated with establishing a communication system between a HAP 200 and ground station 110 is the movement of the HAP 200. One solution to this problem is the use of an omnidirectional antenna system on the HAP 200 and ground station 110. This presents disadvantages, as an omnidirectional antenna has a lower gain and therefore range in exchange for its ability to receive from all directions. A directional antenna may be used to improve the gain and range of the system, but this presents its own challenges as depending on how directional the antenna is, the craft may move out of the antennas transmission or reception area. When using a directional antenna, a system needs to move both of the antennas (i.e., the HAP antenna and the ground terminal antenna) to keep the antennas aligned between the aircraft and the ground. This becomes more challenging with greater directionality of the antenna. Additionally, various conditions may cause the HAP 200 to unintentionally move location, such as, but not limited to, wind, thermals, other craft, turbulence, etc., making the system moving the antenna forced to rapidly correct if continuous communication is required. A highly directional antenna may create a narrow cone transmission shape requiring the antenna to be moved on two axes to maintain alignment or a phased antenna array may be used to quickly steer the antenna beam without physically moving the antenna.

Figure 5A:
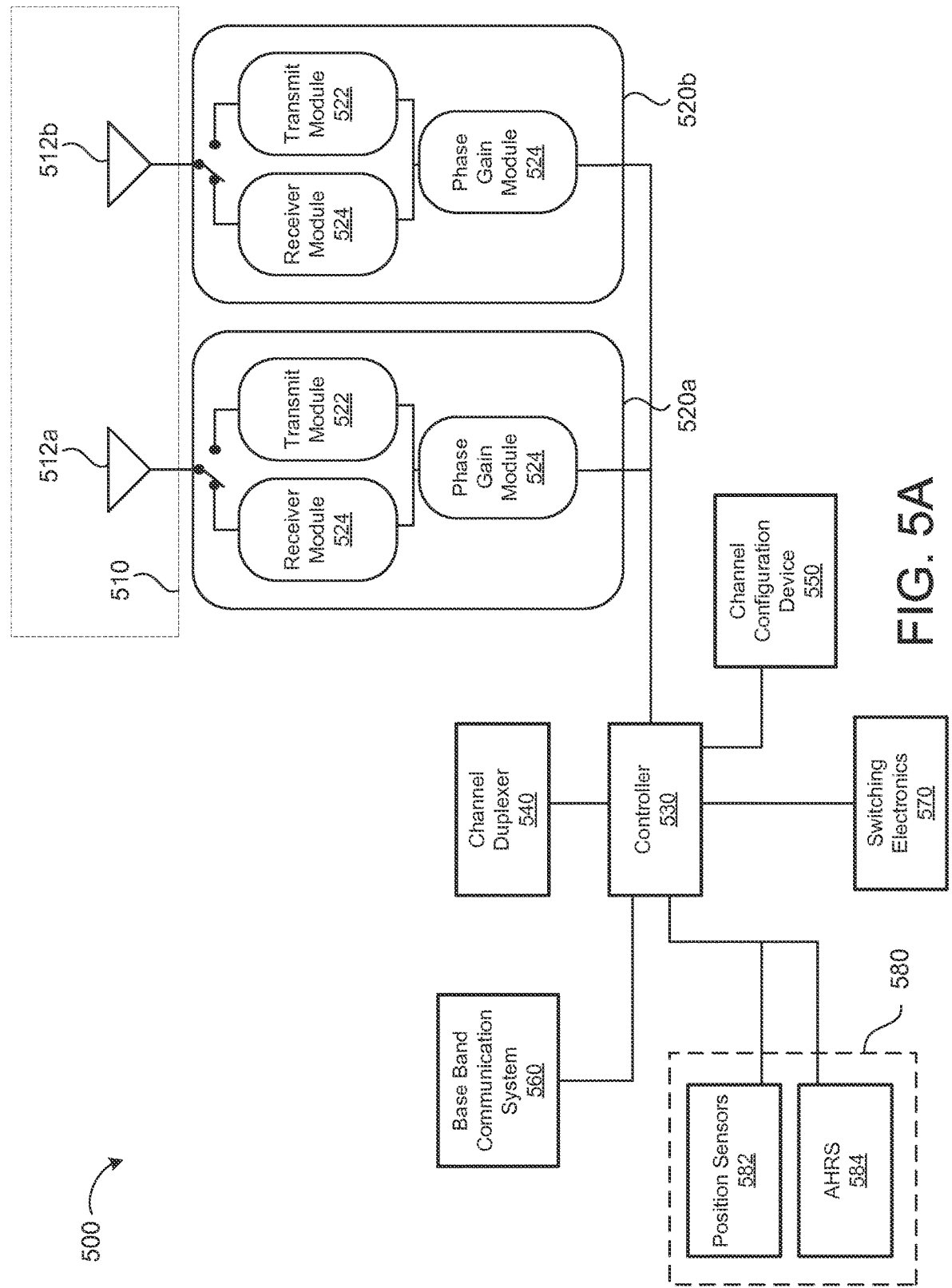
FIG. 5A is a schematic view of an exemplary radio frequency module, which may be connected to the body of the high altitude platform.

FIG. 5A provides a schematic view of an exemplary radio frequency module 500, which may be connected to the body 210 of the HAP 200. The RF module 500 includes an antenna array 510. The antenna array 510 is composed of multiple antenna 512a, 512b. There is no limit to the number of antenna 512 contained in the antenna array 510. The greater the number of antenna 512 contained in the antenna array 510 increases the sensitivity and response of the antenna array 510. Each individual antenna 512 within the antenna array 510 may have the respective phase and gain of the antenna 512 changed in order to steer the beam emitted from the antenna array 510. In some examples, each antenna 512 within the antenna array 510 has the respective phase and gain of the antenna 512 changed in order to alter the shape of the beam emitted from the antenna array 510. Each antenna 512 within the antenna array 510 is connected to a transceiver 520. The transceiver 520 emits and receives electromagnetic energy to form radio communication links. Contained within each individual transceiver 520 is a transmit module 522, a receiver module 524, and a phase gain module 526. The transmit module 522 is used to transmit electromagnetic energy using the antenna 512. The receive module 524 receives electromagnetic energy using the antenna 512 and converts it to a form suitable for the controller 530 to use. The phase gain module 526 adjusts the signal's phase and gain when traveling from the controller 530 to the transmit module 522 or from the receive module 524 to the controller 530.

The controller 530 is connected to a channel duplexer 540, a channel configuration device 550, a base band communication system 560, switching electronics 570, and position sensors 580. The controller receives and communicates instructions from each of the channel duplexer 540, the channel configuration device 550, the base band communication system 560, the switching electronics 570, and the position sensors 580. The channel duplexer 540 includes necessary electronics to allow full duplex communication or continuous two directional communications. The channel duplexer 540 may instruct the controller 530 to transmit on a specific radio channel in one direction and may coordinate communications from other devices, such as other HAPS 200, ground stations 110, or user devices 402. The channel configuration device 550 includes the necessary hardware and electronics to select and configure the specific radio frequency channel in use between multiple devices. In some examples, the channel configuration device 550 senses interference and activity on the radio spectrum in order to select the channel or range of channels with the least interference and the greatest signal transmission strength. The channel configuration device 550 may also command the controller to switch the current channel in use to a different channel to improve the communication link robustness. The base band communication system 560 includes the necessary hardware in order to generate the baseband signal for transmission by the antenna array 510. The base band communication system 560 may also include processors and modems to convert a digital signal in a manner suitable for radio transmission. The switching electronics 570 include the necessary hardware to control the switching of information and packet data between various systems in communication with the RF module 500. In some examples, the switching electronics 570 combine multiple streams of data from multiple RF modules 500 to provide improved link bandwidth or efficiency. The platform sensors 580 include multiple sensors including a position sensor 582, and an attitude and heading reference system (AHRS) 584. The position sensor 582 may use multiple sources to determine the position of the RF module 500 including but not limited to global position satellites, internal navigation, ground based reference systems, and or radio triangulation. The AHRS 584 includes the necessary sensors to determine heading, pitch, yaw. Generally, the AHRS 584 will include a three axis gyroscope, a three axis accelerometer, and a three axis magnetometer. Using the combined information from the three axis gyroscope, the three axis accelerometer, and the three axis magnetometer the AHRS 584 is capable of determining the heading, pitch and yaw of the RF module 500. In some examples, the AHRS 584 will include airspeed and pressure sensors in order to determine airspeed and altitude in addition to heading, pitch and yaw. Not all RF modules 500 require their own individual platform sensors 580, multiple RF modules 500 may share information between a signal set of platform sensors 580 or obtain the information from platform sensors 580 attached to the HAP 200. The transceiver 520 and controller 530 may work in conjunction with each other to operate in burst mode, buffering transmissions until a predetermined amount of data is received and transmitting it at a higher rate than the received rate in order to conserve energy and reduce frequency usage. In some examples, the transceiver 520, the controller 530, the channel duplexer 540, the channel configuration device 550, the base band communication system 560, the switching electronics 570, and the position sensors 580 all operate in the millimeter wave frequency of 30 GHz to 300 Ghz.

Figure 5B:
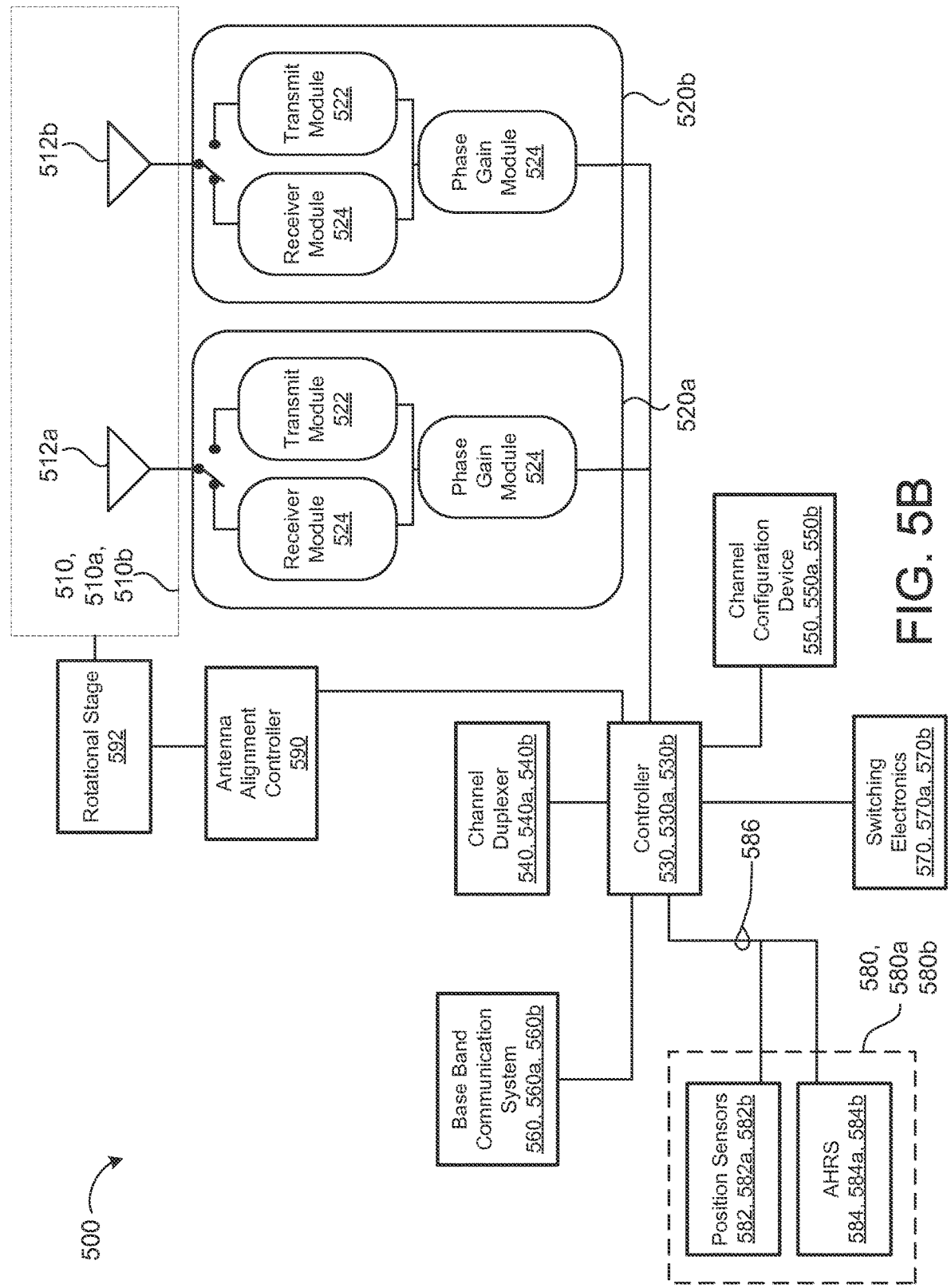
FIG. 5B is a schematic view of an exemplary radio frequency module, with an antenna alignment controller and rotational stage.

FIG. 5B provides a schematic view of an exemplary radio frequency module 500, with an antenna alignment controller 590 and rotational stage 592. The RF module 500 includes an antenna alignment controller 590 that receives a position information 586 from the platform sensors 580. In at least one example, the antenna alignment controller 590 compares the position information 586 from the platform sensors 580 and compares it to a known location of the ground station 110, user devices 402, other HAPs 200, and or satellites 300 to determine how much the antenna array 510 needs to rotate in order to be in alignment with the ground station 110, user devices 402, other HAPs 200, and or satellites 300. The ground station 110, user devices 402, other HAPs 200, and or satellites 300 may each transmit their own position from known information or their own platform sensors using the radio frequency communications system of the RF module 500. The antenna alignment controller 590 may transmit a desired rotation angle to the rotation stage 592. A motor or other motion device may turn the rotation stage 592 rotating the antenna array 510 to the desired rotation angle. The antenna alignment controller 590 may use the signal strength information to adjust the position of the rotational stage 592 in order to improve the signal received by the antenna array 510.

In some examples, a HAP 200 needs to provide two inter-satellite 300 links (forward and backward), with non-symmetrical bi-directional Gigabit backhaul networks of 10 Gbps, and 2.5 Gbps. Two RF modules 500 may be configured such that each has five radio frequency channels, either configured as four transmit channels and one receive channel, or as one transmit channel and four receive channels, depending on the data traffic requirements and satellite 300 platform position and heading as determined by the platform sensors 580. Each channel may be able to support a 2.5 Gbps data-rate. The radio frequency channels created by the channel configuration device 550 divide the channel into two groups of three and two, with each group having either a right hand circular polarization or a left hand circular polarization and are multiplexed by the channel duplexer 540 and transmitted or received using the transceivers 520 and antenna array 510. Each polarization group has either three or two radio frequency channels, which are multiplexing by channel duplexer 540 and may be distributed vertically across the band spectrum. In some implementations, the switching electronics 570 include transmit receive waveguide switches, and or mmWave circulators, in order to allow for rapid transmit and receive channel reconfigurations and to support satellite 300 platform yaw-flipping, pitch maneuver, and dynamic data traffic operation. For each transmit or receive electronics in use, the alternative transmit or revise module is powered down to save power. The switching electronics 570 and controller 530 provide dynamic routing of the data traffic from other communication links, such as ground stations 110, user devices 402, HAPs 200 and other satellites 300.

In additional examples, a HAP 200 needs to provide at least three inter-high-altitude-platform links, with symmetrical bi-directional Gigabit backhaul networks of 5 Gbps each direction. Each RF module 500 may be configured with two radio frequency channels. The two radio frequency channels are multiplexed into the antenna array 510 using the channel duplexer 540. The channel duplexer 540 may be either a fixed-frequency diplexer (Frequency Diplexing), or an orthogonal mode transducer (Polarization Diplexing). The channel configuration device 550 may use either transmit receive waveguide switches, or mmWave circulators, and may be used to support drone station-keeping circling, or yaw rotation. During operation, the transceiver 520 may shut down the non-used transmit module 522 or receive module 524 in order to conserve power. The controller 530 and switching electronics 570 are dynamically routing the data traffic from other communication links ground stations 110, user devices 402, HAPs 200 and other satellites 300. The platform sensors 580 are continuously sensing the high-mobility platform position and heading, to provide information for the controller 530, channel configuration device 550, and switching electronics 570 for beam-alignments. In some implementations, the platform sensors 580 provide information to the controller 530 allowing the phase gain controller 526 to be adjusted for optimal beam forming and direction on the antenna array 510 when using a phased array antenna.

Referring now to FIGS. 5C-5F. Each of FIGS. 5C-5F displays a schematic of an implementation of the radio frequency module 500. Each module is connected to the HAP 200 by a data bus 534 and a control bus 536. The data bus 534 provides a connection for data to be transmitted or received from the radio frequency module 500. The control bus 536 provides a connection to the HAP 200 and sensors to the main controller 530 or radio system processor. Connected to the controller 530 are the platform sensors 580, including the position sensor 582 and AHRS 584 modules. The position module 582 and AHRS 584 module provide information to the controller 530, which allows the antenna alignment controller 590 to direct the rotational stage 592 to provide proper alignment of the antenna 510 for operation of the radio link. The data bus 534 and the controller 530 are connected to the baseband communication system 560. The baseband communication system 560 receives data from the data bus 534 and converts it into a form that is suitable for a transmission through a transceiver 520. A series of analog to digital converters 532 convert the data from a digital form to a form suitable for transmission, and from a transmission form to a digital form suitable for the data bus 534.

Figure 5C:
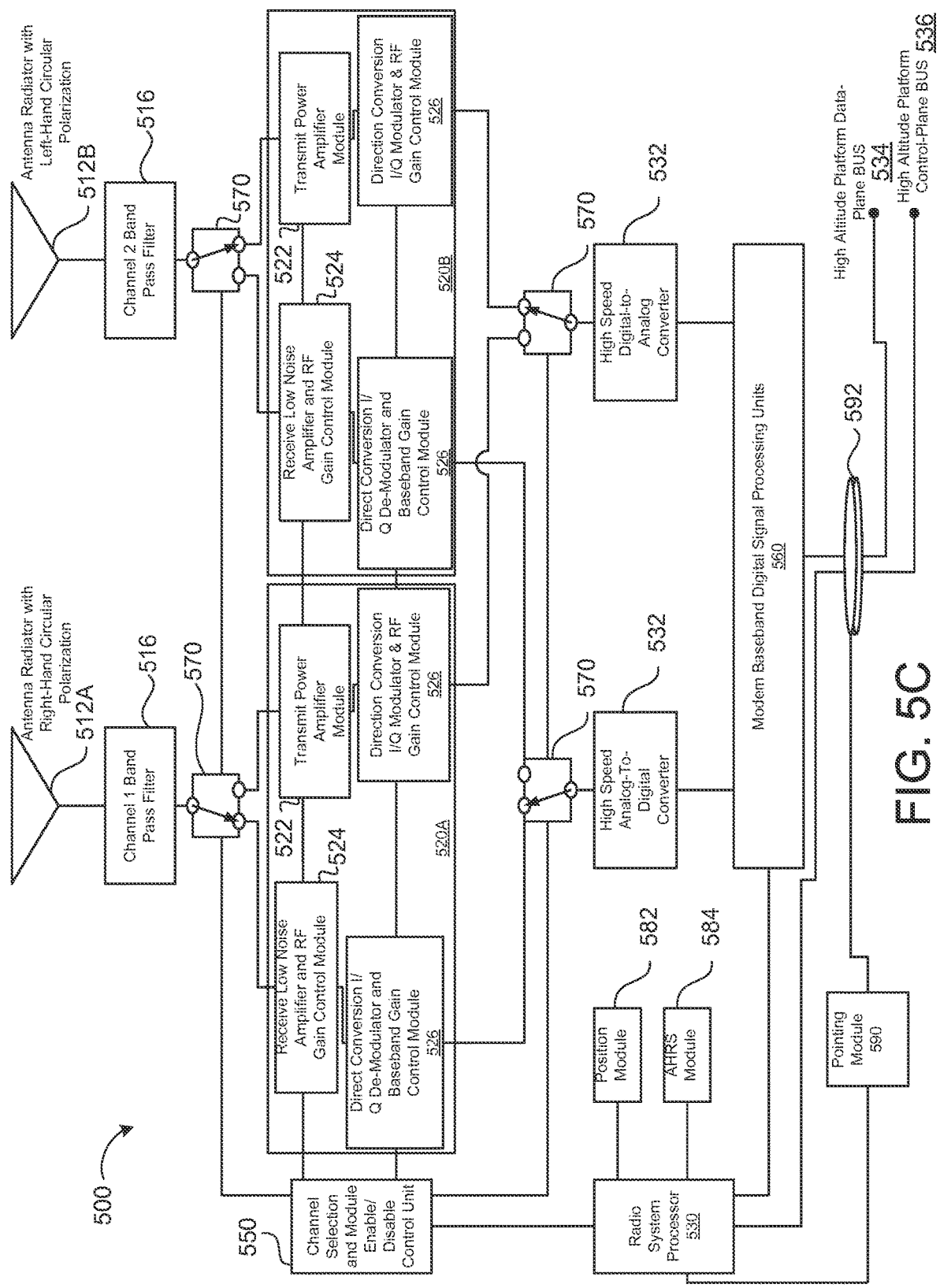
FIG. 5C is a schematic view of a radio frequency module including two transceivers and two antenna.

FIG. 5C provides a schematic view of a radio frequency module 500 including two transceivers 520 and two antenna 512. The first antenna 512A is a right hand circular polarized antenna. The second antenna 512b is a left hand circular polarized antenna. A channel configuration device 550 is connected to the control unit 530. The channel configuration device 550 is connected to the switching hardware 570. The switching hardware 570 allows the transmit module 524 or receive module 524 of each transceiver 520a . . . b to be connected to either the first antenna 512a or the second antenna 512b. Depending on the demand of the radio frequency system 500, the channel configuration device 550 may connect the first transceiver 520a to the first antenna 512a, and connect the second transceiver 520b to the second antenna 512b. Both the first transceiver 520a and the second transceiver 520b may operate, transmit, or receive at the same time due to the difference in polarization between the antennas 512, allowing maximum data throughput. In some examples, the channel configuration device 550 connects the first transceiver 520a to the first antenna 512a and connects the second transceiver 520b to the second antenna 512b, allowing one to receive and one to transmit simultaneously.

Figure 5D:
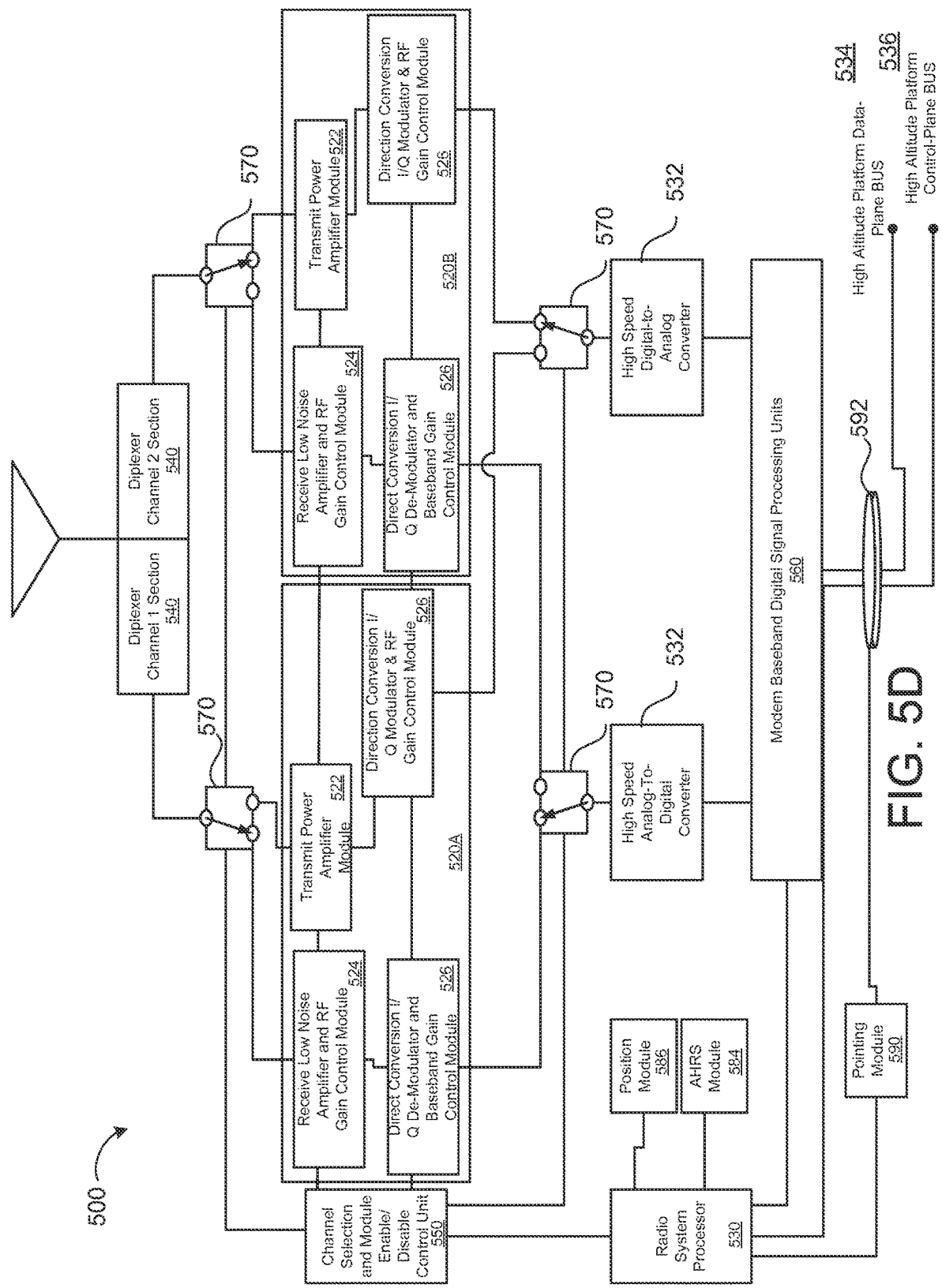
FIG. 5D is a schematic view of a radio frequency module including a channel duplexer and two transceivers.

FIG. 5D provides a schematic view of a radio frequency module 500 including a channel duplexer 540 and two transceivers 512. The channel duplexer 540 is connected to the antenna 512 and to the first transceiver 520a and the second transceiver 520b. The channel duplexer 540 allows two or more channels to be combined through frequency or time duplexing. The channel configuration device 550 is connected to the switching hardware 570. The switching hardware 570 allows either the transmit module 522 or the receive module 524 to be connected to the channel duplexer 540. Depending on the data transmission needs, the channel configuration device 550 may connect both the transmit module 522 of the first transceiver 520a and the transmit module 522 of the second transceiver 520b to the channel duplexer 540. This configuration allows simultaneous transmission, maximizing data transmission rates. The receiver module 524 of the first transceiver 520a and the receive module 524 of the second transceiver 520b may be connected to the channel duplexer 540, allowing for maximum data reception rates. In some examples, a combination of transmission modules 522 and reception modules 524 are connected to the channel duplexer 540 to allow for simultaneous two way communication.

Figure 5E:
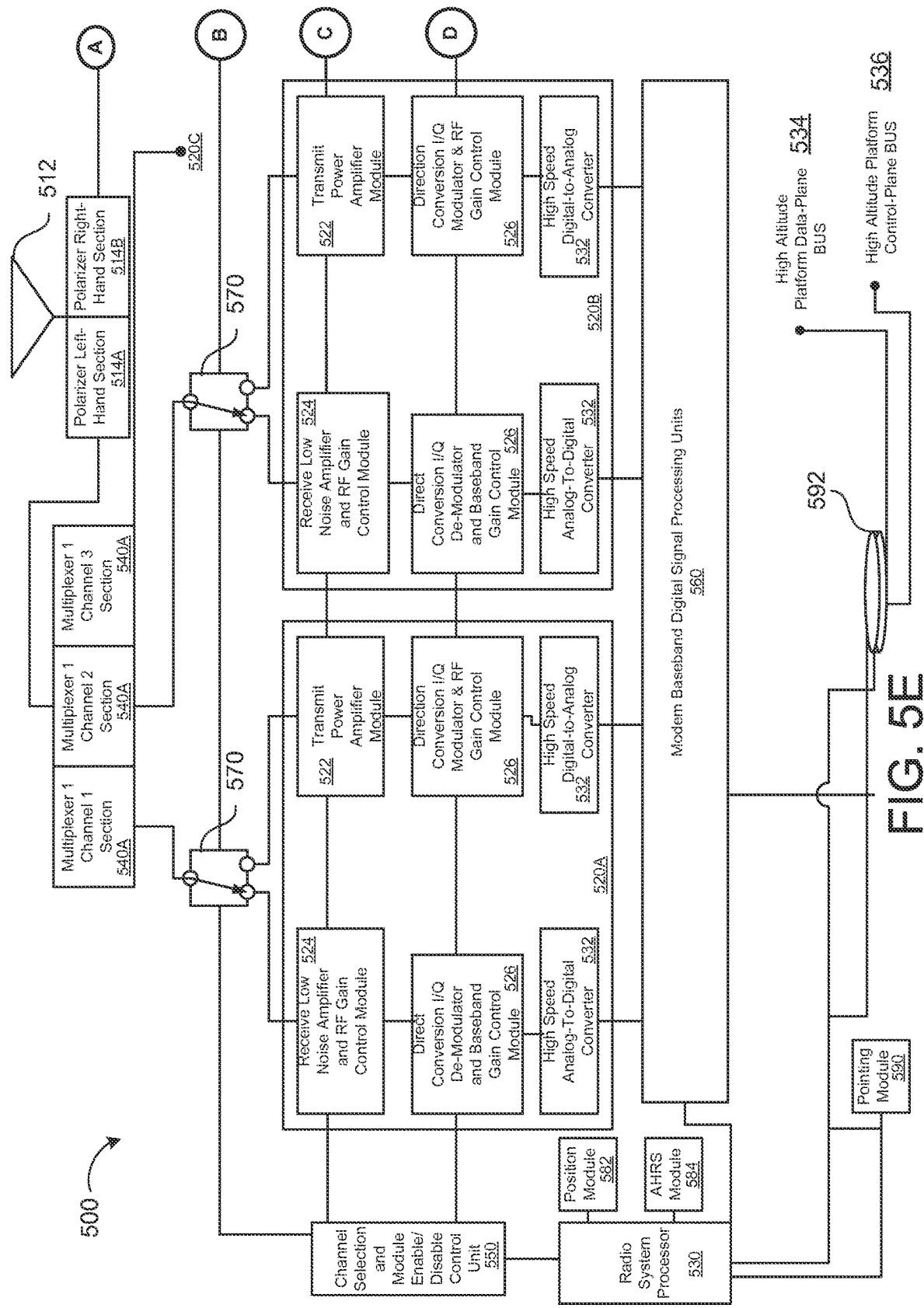
FIGS. 5E-5F are a schematic view of a radio frequency module including a channel multiplexer and six transceivers.
Figure 5F:
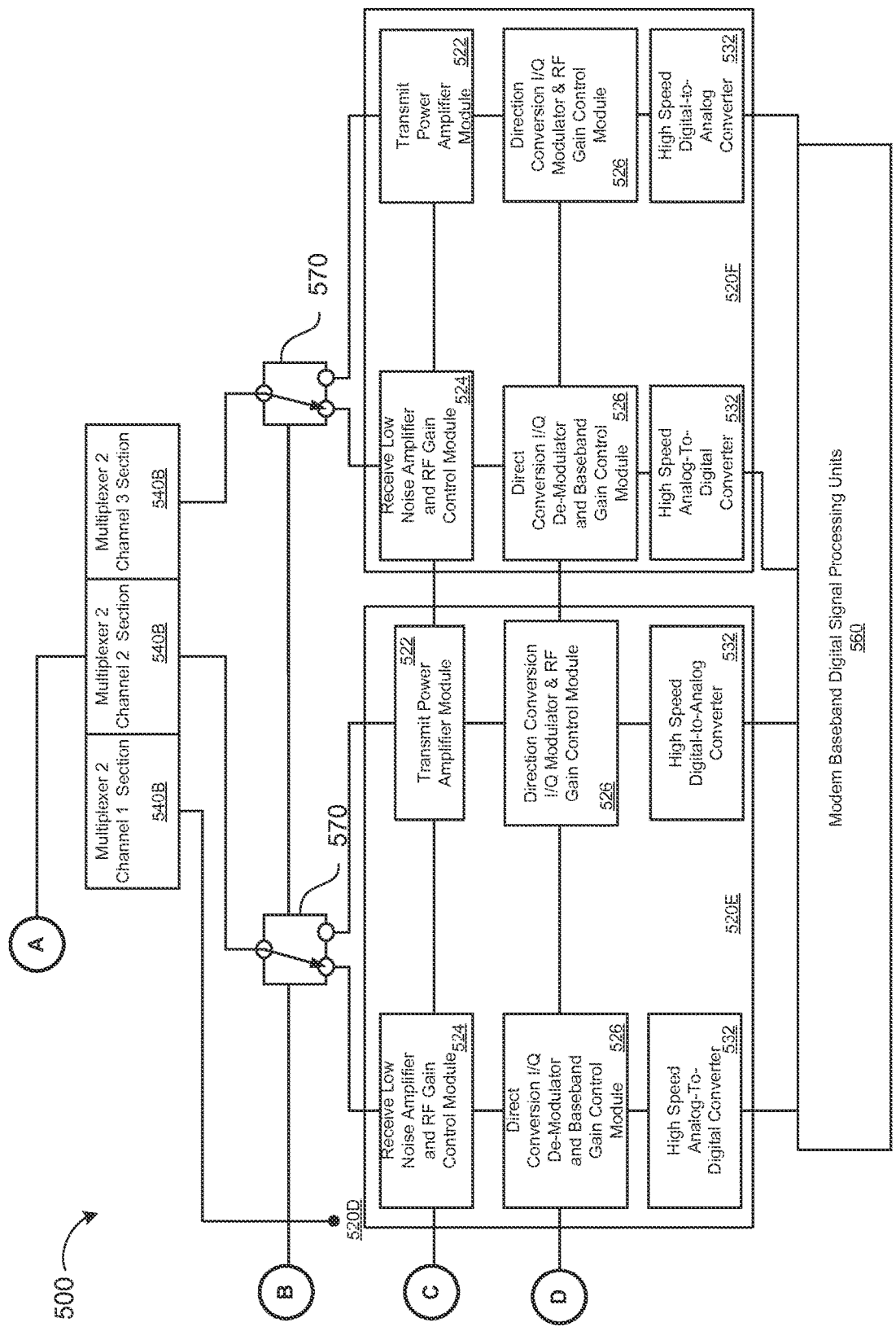

FIGS. 5E-5F provide a schematic view of a radio frequency module 500, including a channel multiplexer 540 and six transceivers 512. A first transceiver 520a, a second transceiver 520b, a third transceiver 520c, a fourth transceiver 520d, a fifth transceiver 520e, and a sixth transceiver 520f are connected to switching electronics 570. The switching electronics 570 are controlled by the channel configuration device 560. The channel configuration device 570, though the switching electronics 570, allows any of the transceivers 520, 520a . . . f to be configured to transmit, receive, or off. The first transceiver 520a, the second transceiver 520b and the third transceiver 520c are connected to a first multiplexer 540. The multiplexer 540 allows multiple transmit and receive signals to be operated using a single antenna 512. The first multiplexer 540a is connected to the left hand polarizer section 514a. The left hand polarizer section 514a gives the signal that is being transmitted or revived a left hand polarization, allowing it not to interfere with a right hand polarization signal. The fourth transceiver 520d, the fifth transceiver 520e, and the sixth transceiver 520f are connected to a second multiplexer 540. The multiplexer 540 allows multiple transmit and receive signals to be operated using a single antenna 512. The second multiplexer 540a is connected to the right hand polarizer section 514b. The right hand polarizer section 514a gives the signal that is being transmitted or revived a right hand polarization, allowing it not to interfere with a right hand polarization signal. Each of the transceivers 520, 520a . . . f is separated by the first or second multiplexer 540, 540a . . . b and the polarizer 514, and connected to a single antenna 512. This allows each of the transceivers 520, 520a . . . f to be operated in either transmit, receive, or off mode simultaneously and independently, depending on the transmission data needs. As one example, the first transceiver 520a, the third transceiver 520c, and the sixth transceiver 520f may be operated in a transmit mode, or transmitting data. The second transceiver 520b, and fourth transceiver 520d may be in receive mode, receiving data. The fifth transceiver 520e may be off to conserve power. Any combination of configurations for the transceivers 520, 520a . . . f may be used.

Figure 6:
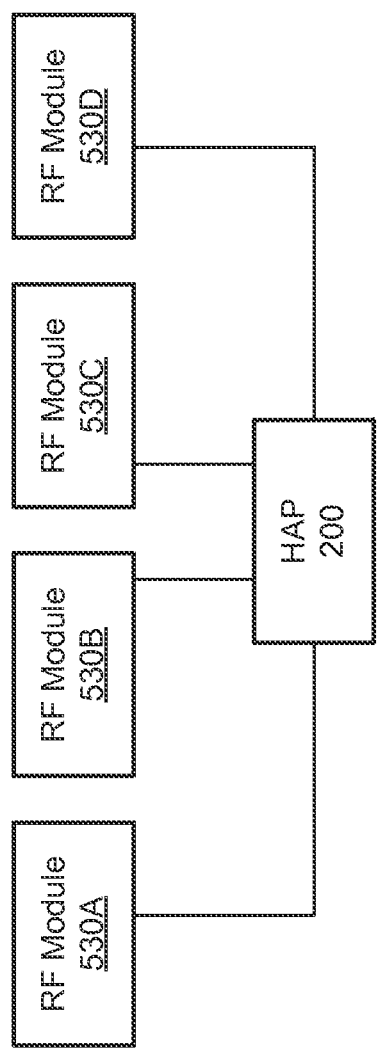
FIG. 6 is a schematic view of four RF modules attached to a high altitude platform.

FIG. 6 provides a schematic view of four RF modules 500 attached to a HAP 200. A first RF module 500a, a second RF module 500b, a third RF module 500c, and a fourth RF module 500d are attached to a HAP200 and are in communication with each other. Each RF module 500a . . . d is capable of sharing data between each other and issuing commands to each other. Examples of such commands include, but are not limited to, powering up or down, sharing of data and bandwidth, switching transmission modes from transmit mode to receive mode, sharing platform sensor information, etc.

FIG. 7 shows a method 700 for operating a RF module 500 attached to a HAP 200. At block 702, the method 700 includes transmitting data from a first high altitude platform 200a to a second high altitude platform 200b using a first radio frequency module 500a connected to the first high altitude platform 200a. At block 704, the method 700 also includes receiving data at the first high altitude platform 200a transmitted from the second high altitude platform 200b, using a second radio frequency module 500b connected to the first high altitude platform 200a. The first radio frequency module includes a first antenna 510a, a first channel duplexing device 540a connected to the first antenna 510a, a first plurality of channel reconfiguration devices 550a connected to the first antenna 510a, and a first transceiver 520a connected to the first antenna 510a. The first transceiver 520a is configured to operate the first antenna 510a at a frequency of greater than approximately 30 GHz. The first transceiver 520a further includes a first controller 530a connected to the first transceiver 520a and is configured to transmit and receive data through the first antenna 510a. The second radio frequency module 500b includes a second antenna 510b, a second channel duplexing device 540b connected to the second antenna 510b, a second plurality of channel reconfiguration devices 550b connected to the second antenna 510b, and a second transceiver 520b connected to the second antenna 510b. The second transceiver 520b is configured to operate the second antenna 510b at a frequency of greater than approximately 30 GHz. The second controller 530b is connected to the second transceiver 520b and configured to transmit and receive data through the second antenna 510b.

The first controller 530a is configured to disable the second radio frequency module 500b based on data received through the first antenna 510a. In some examples, the first controller 530a is configured to disable the second radio frequency module 500b based on data received through a command link. The first radio frequency module 500a may include a sensor or platform sensors 580 connected to the first controller 530a and configured to sense position information 586 regarding the first high altitude platform 200a. The method 700 may further include transmitting position information 586 from the first high altitude platform 200a to the second high altitude platform 200b using the first radio frequency module 500a. The method 700 may include steering the first antenna 510a based on the position information 586.

In some examples, the method 700 includes adjusting the first transceiver 520a from a receive configuration to a transmit configuration based on data received through the first antenna 510a. The method 700 may further include adjusting the second radio frequency module 500b from a receive configuration to a transmit configuration based on data received through the first antenna 510a. In some implementations, the method 700 includes adjusting the first radio frequency module 500a and second radio frequency module 500b from a receive configuration to a transmit configuration based on the amount of data received through the first radio frequency module 500a and second radio frequency module 500b. The first antenna 510a may be a phased array antenna and the second antenna 510b may be a mechanically steered antenna. The method 700 may include transmitting data to a ground station 110. The first transceiver 520a may operate a full duplex bi-directional communication link.

In some examples, the method 700 includes transmitting data to a ground station 110 using a third radio frequency module 500c while simultaneously transmitting data to the second high altitude platform 200b using the first radio frequency module 500a and receiving data from the second high altitude platform 200b using the second radio frequency module 500b. The method 700 may also include transmitting data to a satellite 300 using a third radio frequency module 500c while simultaneously transmitting data to the second high altitude platform 200b using the first radio frequency module 500a and receiving data from the second high altitude platform 200b using the second radio frequency module 500b. The method 700 may further include transmitting data to a ground station 110 using a fourth radio frequency module 500d while simultaneously transmitting data to the second high altitude platform 200b using the first radio frequency module 500a, transmitting data to satellite 300 using the third radio frequency module 500c, and receiving data from the second high altitude platform 200b using the second radio frequency module 500b.

A number of implementations have been described. Nevertheless, it will be understood that various modifications may be made without departing from the spirit and scope of the disclosure. Accordingly, other implementations are within the scope of the following claims.

What is claimed is:
1. A system comprising:
   a high altitude platform;
   a first radio frequency module connected to the high altitude platform, the first radio frequency module comprising:
   a first antenna;
   a first channel duplexing device connected to the first antenna;
   a first plurality of channel reconfiguration devices connected to the first antenna;
   a first transceiver connected to the first antenna, the first transceiver configured to operate the first antenna at millimeter wave frequencies; and
   a first controller connected to the first transceiver and configured to transmit and receive data through the first antenna; and
   a second radio frequency module connected to the high altitude platform, the second radio frequency module comprising:
   a second antenna;
   a second channel duplexing device connected to the second antenna;

a second plurality of channel reconfiguration devices connected to the second antenna;
a second transceiver connected to the second antenna, the second transceiver configured to operate the second antenna at millimeter wave frequencies; and
a second controller connected to the second transceiver and configured to transmit and receive data through the second antenna,
wherein the first controller is configured to disable the second radio frequency module based on data received through the first antenna, the received data including a flight condition warning.

2. The system of claim 1, wherein the first radio frequency module further comprises one or more sensors connected to the controller and configured to sense position, attitude, and/or heading information regarding the high altitude platform.

3. The system of claim 2, wherein the controller is configured to transmit the position, attitude, and/or heading information from the one or more sensors through an auxiliary radio link.

4. The system of claim 3, wherein the first antenna is steerable and steered based on the position, attitude, and/or heading information.

5. The system of claim 3, wherein the first controller is configured to change the first transceiver from a receive configuration to a transmit configuration based on network traffic requirements and a geometrical status of the high altitude platform received through the auxiliary radio link.

6. A method comprising:
transmitting data from a first high altitude platform to a second high altitude platform using a first radio frequency module connected to the first high altitude platform;
receiving data at the first high altitude platform transmitted from the second-high altitude platform using a second radio frequency module connected to the first high altitude platform,
wherein the first radio frequency module comprises:
a first antenna;
a first channel duplexing device connected to the first antenna;
a first plurality of channel reconfiguration devices connected to the first antenna;
a first transceiver connected to the first antenna, the first transceiver configured to operate the first antenna at millimeter wave frequencies; and
a first controller connected to the first transceiver and configured to transmit and receive data through the first antenna, and
wherein the second radio frequency module comprises:
a second antenna;
a second channel duplexing device connected to the second antenna;
a second plurality of channel reconfiguration devices connected to the second antenna;
a second transceiver connected to the second antenna, the second transceiver configured to operate the second antenna at millimeter wave frequencies; and
a second controller connected to the second transceiver and configured to transmit and receive data through the second antenna;
the method further comprising the first controller disabling the second radio frequency module based on data received through either the first antenna or a command link, the received data including a flight condition warning.

7. The method of claim 6, wherein the first radio frequency module further comprises one or more sensors connected to the first controller and configured to sense position, attitude, and/or heading information regarding the first high altitude platform.

8. The method of claim 7, further comprising transmitting position, attitude, and/or heading information through an auxiliary radio link.

9. The method of claim 8, further comprising steering the first antenna based on the position, attitude, and/or heading information.

10. The method of claim 8, further comprising adjusting the first transceiver from a receive configuration to a transmit configuration based on network traffic requirements and a geometrical status of the high altitude platform received through the auxiliary radio link.

11. A system comprising:
a high altitude platform;
an antenna connected to the high altitude platform;
a first radio frequency module connected to the high altitude platform, the first radio frequency module comprising:
a first channel duplexing device connected to the antenna;
a first plurality of channel reconfiguration devices connected to the first channel duplexing device; and
a first transceiver connected to first plurality of channel reconfiguration devices, the first transceiver configured to operate at millimeter wave frequencies; and
a second radio frequency module connected to the high altitude platform, the second radio frequency module comprising:
a second channel duplexing device connected to the antenna;
a second plurality of channel reconfiguration devices connected to the second channel duplexing device; and
a second transceiver connected to the second plurality of channel reconfiguration devices, the second transceiver configured to operate at millimeter wave frequencies;
a controller connected to the first radio frequency module and second radio frequency module and configured to transmit and receive data through the antenna, wherein the controller is configured to disable the second radio frequency module based on received data, the received data including a flight condition warning.

12. The system of claim 1, wherein the flight condition warning is based on one or more conditions that may cause the high altitude platform to unintentionally move location.

13. The system of claim 12, wherein the one or more conditions that may cause the high altitude platform to unintentionally move location include one or more of wind, thermals, turbulence, or other aircraft.

14. The system of claim 12, wherein the high altitude platform is a communication balloon.

15. The method of claim 6, wherein the flight condition warning is based on one or more conditions that may cause the first high altitude platform to unintentionally move location.

16. The method of claim 15, wherein the one or more conditions that may cause the first high altitude platform to unintentionally move location include one or more of wind, thermals, turbulence, or other aircraft.

17. The method of claim 15, wherein the first high altitude platform is a communication balloon.

18. The system of claim 11, wherein the flight condition warning is based on one or more conditions that may cause the high altitude platform to unintentionally move location.

19. The system of claim 18, wherein the one or more conditions that may cause the high altitude platform to unintentionally move location include one or more of wind, thermals, turbulence, or other aircraft.

20. The system of claim 18, wherein the high altitude platform is a communication balloon.

* * * * *